United States Patent
Megles

[15] 3,653,865
[45] Apr. 4, 1972

[54] NEPHELINE-FELDSPAR GLASS-CERAMICS

[72] Inventor: John E. Megles, Corning, N.Y.
[73] Assignee: Corning Glass Works, Corning, N.Y.
[22] Filed: June 2, 1970
[21] Appl. No.: 42,838

[52] U.S. Cl. .................................65/33, 65/30, 106/52
[51] Int. Cl. ...........................................C03b 29/00
[58] Field of Search .............................65/33; 106/52

[56] References Cited

UNITED STATES PATENTS

| | | | |
|---|---|---|---|
| 3,201,266 | 8/1965 | MacDowell | 65/33 X |
| 3,170,805 | 2/1965 | McMillan et al. | 65/33 X |
| 3,298,553 | 1/1967 | Lusher | 65/33 X |
| 3,313,609 | 4/1967 | Megles | 65/33 |
| 3,490,888 | 1/1970 | Strong | 65/33 |
| 3,241,985 | 3/1966 | Kuwayama | 65/33 X |
| 3,464,880 | 9/1969 | Rinehart | 65/33 |
| 3,325,299 | 6/1967 | Aravjo | 65/33 X |
| 3,352,656 | 11/1967 | McMillan et al. | 65/33 |
| 3,455,706 | 6/1969 | Takagi et al. | 65/33 X |

Primary Examiner—Frank W. Miga
Attorney—Clarence R. Patty, Jr. and Clinton S. Janes, Jr.

[57] ABSTRACT

An improved method for the manufacture of fine-grained glass-ceramic articles wherein the crystal phase consists essentially of nepheline with, optionally, a minor amount of feldspar characterized by high mechanical strength and being useful for many consumer ware and technical applications.

6 Claims, 1 Drawing Figure

Patented April 4, 1972 3,653,865
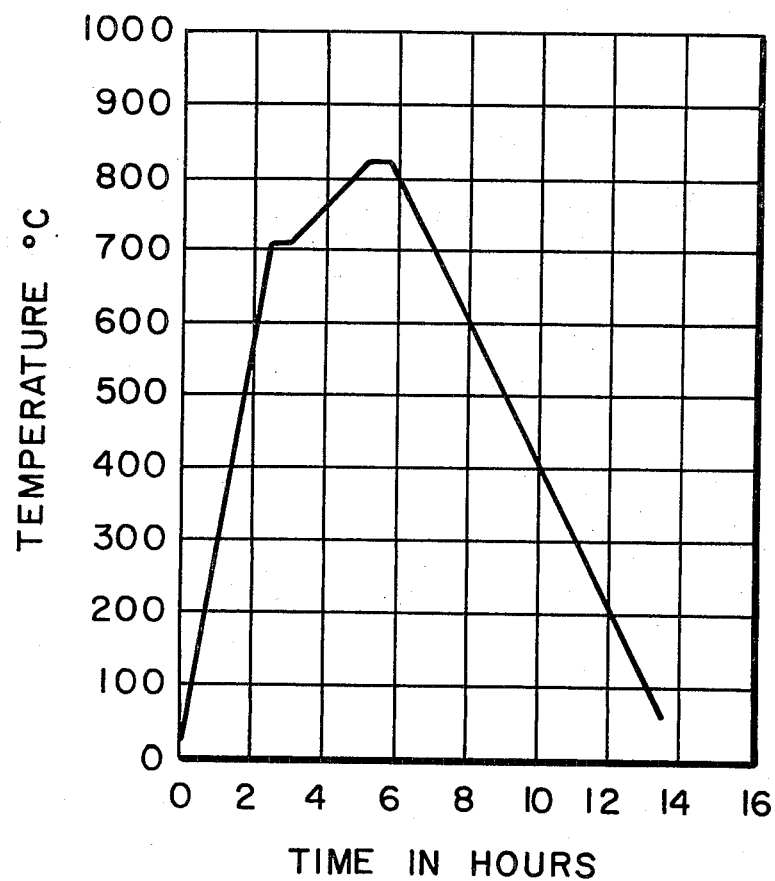
INVENTOR.
John E. Megles
BY
ATTORNEY

NEPHELINE-FELDSPAR GLASS-CERAMICS

U.S. Pat. No. 2,920,971, a basic patent in the art of manufacturing glass-ceramic articles, discloses glass compositions and methods which can be utilized in the manufacture of glass-ceramics. That patent describes a process comprising melting a batch for a glass, introducing into the batch a nucleation or crystallization promoting agent, forming the glass into conventional configurations using conventional methods, and thereafter heat treating the articles according to a precisely defined time-temperature schedule so as to cause controlled crystallization in situ of the glass. Glass articles may thereby be converted into articles consisting essentially of finely divided crystals randomly but substantially uniformly dispersed within a glassy matrix and comprising a major proportion of the mass of the said articles.

Since the discovery of practical methods of manufacturing glass-ceramics, numerous applications for such materials have been proposed, and many discoveries have been made regarding compositions and methods useful in producing new glass-ceramics for particular applications.

Glass-ceramic materials to be used for kitchen ware or dinnerware articles must exhibit high mechanical strength, good thermal shock resistance, low, or preferably, no porosity, good chemical durability, and a pleasing aesthetic appearance. U.S. Pat. No. 3,313,609 discloses one method of making glass-ceramic articles containing nepheline as the principal crystalline phase which are suitable for such applications. It is the object of this invention to provide an improved method of manufacture of such articles wherein the characteristics of high mechanical strength, good thermal shock resistance, extremely low porosity, good chemical durability, and aesthetic appearance may be obtained through the employment of much shorter heat treatments at much lower temperatures than hitherto believed practicable.

It is another object of this invention to provide improved articles exhibiting the aforementioned desirable characteristics which are suitable for both dinnerware and technical applications.

Other objects will become apparent from the following description and the accompanying drawing which sets forth a time-temperature curve for the heat treatment of a specific embodiment of invention.

I have discovered that a fine-grained semicrystalline body containing nepheline ($Na_2 \cdot Al_2O_3 \cdot 2SiO_2$) as the primary crystalline phase with, optionally, minor amounts of feldspar ($Na_2O$, $K_2O \cdot Al_2O_3 \cdot 6SiO_2$) and exhibiting the high mechanical strength attributable to an even, fine-grained crystal structure can be produced from a glass body having a composition within a specified range by following a ceramming schedule (i.e., a precisely defined time-temperature treatment) which employs faster heating rates, lower holding temperatures, and shorter dwell times at the holding temperatures than taught by the prior art.

In its broadest terms my invention comprises an improved method of manufacturing glass-ceramics containing a crystal phase consisting essentially of nepheline with, optionally, minor amounts of feldspar wherein after melting a batch for a glass of a composition hereinafter described and forming a glass article therefrom, the glass article is heat treated according to a schedule wherein it is first rapidly heated to a temperature of about 680°–730° C., held in that range if necessary for a time sufficient to complete nucleation, then heated to a temperature of about 800°–850° C., held in that range until the desired crystallization is attained, and finally cooled to room temperature.

Glass articles which may be successfully treated according to the present invention consist essentially, on a weight percent basis, of about 26–56% $SiO_2$, 25–30% $Al_2O_3$, 16–20% $Na_2O + CaO$, wherein $Na_2O$ ranges 10–14% and CaO ranges 4–9% by weight of the batch, 0.1–4% MgO, and 2.5–10% $TiO_2$. Additions of other compatible oxides may be made in the indicated proportions as selected from the group consisting of 0–5% $K_2O$, 0–10% PbO, 0–5% ZnO, 0–5% CdO, 0–2% $Li_2O$, and 0–3% $B_2O_3$, provided such additions total not more than 10 percent by weight of the batch. The aforementioned composition ranges have been found to be critical in manufacturing a body wherein the crystal phase consists essentially of nepheline with, optionally, minor amounts of feldspar. The presence of feldspar in amounts between about 5–25 percent of the total crystallization has been found desirable in producing a lower thermal expansion body with improved thermal shock resistance. The batch ingredients may comprise any materials whether oxides or other compounds, which will yield the desired oxides in the proper proportions upon being fused together.

Table I illustrates an example of a particular composition within the aforementioned composition range, as calculated from the batch in weight percent on the oxide basis, which is preferred in carrying out my invention. Also shown are the typical batch ingredients and the proportions thereof in parts by weight which, upon being fused together into a melt for a glass, will yield the oxide composition appearing therewith. Generally, a fining agent such as $As_2O_3$ is also added to the batch in amounts less than 1 percent by weight, but it has been omitted from the table for convenience, since the residual amount remaining in the glass is too small to have any measurable effect on the properties thereof.

TABLE I

| | | | |
|---|---|---|---|
| $SiO_2$ | 53.2 | Sand | 4314 |
| $Al_2O_3$ | 27.0 | Alumina | 2446 |
| $Na_2O$ | 10.1 | $NaCO_3$ | 1563 |
| CaO | 5.2 | $NaNO_3$ | 275 |
| MgO | 0.9 | $CaCO_3$ | 901 |
| $Li_2O$ | 0.5 | Magnesia | 91 |
| $TiO_2$ | 3.1 | Titanium Dioxide | 302 |
| | | Petalite | 1136 |

Glasses of the aforementioned composition may be prepared according to conventional procedures by melting in pots, tanks, or crucibles at 1,500° C. for at least 4 hours. Articles of the desired shapes may then be formed therefrom by blowing, drawing, pressing, or the like.

Glass articles so formed may be cooled to room temperature for inspection or other purpose if desired. However, where economy in production is important they may instead by cooled only to the transformation range, i.e., that temperature at which the molten glass becomes an amorphous solid, (normally deemed to be between the strain and annealing points of the glass) and then immediately subjected to heat treatment.

The mechanism by which crystallization in situ in a glass body of appropriate composition occurs during heat treatment is described in detail in U.S. Pat. No. 2,920,971. Generally, such a body is first heated to a range of temperatures in which nucleation and the initiation of crystal growth commences at numerous sites throughout the glass body and is held in that range for a length of time sufficient to initiate growth at a large number of sites. The body is then heated further to a temperature range in which the growth of crystals formed during nucleation will proceed rapidly, and is held there until the desired crystallinity is attained.

The rate at which such a body is heated to the nucleation range and the holding or dwell times during which it is maintained at nucleation temperatures are dictated in part by the crystalline structure desired in the finished product. It has been found that the strength of the product is improved by a fine-grained crystal structure which may be produced by maximizing the number of sites within the body at which crystal growth is initiated, so that numerous small crystals rather than fewer large crystals are formed.

The rate at which further heating is undertaken to cause the growth of the crystalline phase within the glass and the temperatures at which the body is held while crystal growth progresses are also limited, since excessively rapid heating rates or holding temperatures will cause distortion of the glass body being treated. If moderate heating rates and holding temperatures are employed, the crystalline phase within the glass, which has a higher melting temperature than the glass itself, will develop sufficiently to provide a measure of support which decreases distortion or slumping of the article. Excessively low heating rates or long holding temperatures in the nucleation or crystallization ranges can result in a coarse-grained irregular crystal phase or incomplete crystallization.

Prior art methods of producing glass-ceramic bodies containing nepheline as the primary crystalline phase generally require comparatively slow heating or long dwell times in the nucleation range, as well as comparatively high temperatures and long dwell times in the crystallization range, to produce a body having a fine-grained, evenly dispersed crystalline structure. Although fast heating times and elevated holding temperatures have been employed, they generally require the utilization of some means of supporting the body during heat treatment to prevent slumping or distortion. A typical prior art heat treating schedule for nepheline-containing glass-ceramic articles provides for heating to a nucleation temperature of about 700° C. at a rate of about 3.3° C. per minute and holding at that temperature for about one-half hour. Subsequently, the articles are heated to a crystallization temperature of about 1,040° C. at a rate of about 1° C. per minute and held thereat for about 2 hours, and then cooled to room temperature at about 3° C. per minute. Such a heating schedule generally requires that articles such as dinnerware be supported while subjected thereto in order to avoid slumping and deformation of the articles, and can be used to achieve modulus of rupture strengths of only about 14,000 p.s.i. in the finished article.

I have now found that heating rates ranging between 5° C. per minute and the maximum furnace heating rate of about 7.5° C. per minute to a nucleation range of about 680°–730° C. can be employed with the glasses of my invention without the need for supporting means to prevent distortion of the article. Further, although holding the article in the nucleation range is not always required, I have found that dwell times not exceeding 1 hour and usually about one-half hour in the nucleation range will initiate crystal growth at a sufficient number of sites within the glass to yield a fine grained structure in the finished product.

The articles then may be heated at a rate ranging from about 1° C. per minute to 5° C. per minute to the crystallization temperature, which for the glasses of my invention ranges from about 800°–850° C., again without providing any supporting means to prevent distortion of the articles. However, distortion may occur if the articles are heated above about 820° C. prior to development of the crystalline phase, and some supporting means might then be required.

Holding times in the crystallization range are usually necessary to attain the desired crystallinity and strength in the finished product, but I have found that not more than about one hour and usually about one-half hour is sufficient to develop the desired degree of crystallinity. Generally, holding times in the crystallization range of up to about 1 hour are useful only when nucleation has been carried out in the lower range of operative temperatures, for example, about 680° C., after rapid heating and without any temperature hold in the nucleation range. Of course, longer holding times in both the nucleation and crystallization ranges may be employed, but as they are uneconomical and inefficient in a production operation and do not substantially improve the characteristics of the finished product, they are not deemed particularly advantageous.

At the end of the desired holding time in the crystallization range, the article may be cooled to room temperature. Although the rate at which this cooling may be accomplished depends on the resistance of the body to thermal shock, and thus to some degree on the size and shape of the body, so that with a small article cooling may be accomplished by removal of the article from the furnace, I have found that a cooling rate not exceeding about 3° C. per minute yields a satisfactory product. A preferred cooling rate is about 1.6° C. per minute or 100° C. per hour, which may be approximated in the laboratory by merely cutting off the supply of heat to the furnace and allowing the article to cool at the furnace rate.

The glass-ceramics of my invention are of particular importance in the manufacture of composite glass bodies wherein they may be used as core glasses in a laminated structure. The methods useful in manufacturing such laminated bodies are discussed in detail in a copending patent application Ser. No. 735,074 wherein I am a co-inventor. They are also useful in the manufacture of glass-ceramic articles coated with compressive glazes according to the methods disclosed in U.S. Pat. No. 3,384,508. However, the utility of the present invention is by no means limited to the manufacture of laminated or glazed bodies according to the aforesaid methods, and the subject matter thereof forms no part of the present invention.

Table II records a number of heat treating schedules according to the invention together with the modulus of rupture and description of the crystalline structure resulting therefrom. The modulus of rupture measurements (p.s.i.) were obtained through conventional methods using rods cut from laminated dinnerware which was abraded with No. 30 grit silicon carbide. These strength values may be compared to values of prior art laminated bodies which may range between about 22,000–33,000 p.s.i. depending upon the ceramming schedules employed. Higher strengths obtained according to the prior art required significantly higher temperature, longer duration schedules. Each of the schedules shown was begun at room temperature and was run on dinnerware of the composition of Table I.

TABLE II

| Run Number | Cycle | Modulus of rupture, crystalline structure |
|---|---|---|
| A [1] | Heat to 700° C. at 5° C./min.<br>Hold for ½ hour.<br>Heat to 800° C. at 1.6° C./min.<br>Hold for ½ hour.<br>Cool at furnace rate. | [3] 60,100 |
| B [1] | Heat to 700° C. at 5° C./min.<br>Hold for ½ hour.<br>Heat to 810° C. at 1° C./min.<br>Hold for ½ hour.<br>Cool at furnace rate. | [3] 61,000 |
| C [1] | Heat to 700° C. at 5° C./min.<br>Hold for ½ hour.<br>Heat to 820° C. at 1.6° C./min.<br>Hold for ½ hour.<br>Cool at furnace rate. | [3] 65,400 |
| D [2] | Heat to 700° C. at 5° C./min.<br>Hold for ½ hour.<br>Heat to 840° C. at 1.6° C./min.<br>Hold for ½ hour.<br>Cool at furnace rate. | [3] 72,400 |
| E [1] | Heat to 700° C. at 5° C./min.<br>Hold for ½ hour.<br>Heat to 800° C. for ½° C./min.<br>Hold for ½ hour.<br>Cool at furnace rate. | [4] 51,500 |
| F [1] | Heat to 720° C. at 5° C./min.<br>Hold for 2 hours.<br>Heat to 820° C. at ½ C./min.<br>Hold for ½ hour.<br>Cool at furnace rate. | [4] 55,200 |
| G [1] | Furnace rate to 700° C.<br>Hold for ½ hour.<br>Heat to 820° C. at 3.3° C./min.<br>Hold for ½ hour.<br>Cool at furnace. | [3] 63,200 |
| H [1] | Heat to 700° C. at 7.5° C./min.<br>Hold for ½ hour.<br>Heat to 820° C. at 1.6° C./min.<br>Hold for ½ hour.<br>Cool at furnace rate. | [3] 65,000 |

[1] Dinnerware not supported.
[2] Dinnerware supported.
[3] P.s.i., fine-grained.
[4] P.s.i., coarse-grained.

It can be seen that my invention provides a means for manufacturing semicrystalline ceramic bodies having nepheline as the primary crystalline phase which exhibit high mechanical strength through the utilization of shorter, lower temperature heat treatment than taught by the prior art.

The accompanying graph records a time-temperature curve for a preferred heat treatment (Run C of Table II) of this invention wherein, after the batch had been melted, as, for example, by heating in an open crucible at a temperature of about 1,500° C. for about 4 hours, shaped, and cooled to room temperature, the glass shape was given the following heat treatment: the temperature was raised from room temperature to 700° C. at a rate of 5° C. per minute and maintained thereat for one-half hour, then raised to 820° C. at a rate of about 1.6° C. per minute and maintained thereat for about one-half hour, and finally cooled to near room temperature at the furnace rate of about 1.6° C. per minute. It will be appreciated that the absence of a requirement for mechanical support during heat treatment according to the invention together with the use of lower, more economical temperatures in carrying out the aforesaid heat treatment lend particular economic importance to the invention.

What is claimed is:

1. A method for manufacturing a glass-ceramic body wherein the crystal phase consists essentially of nepheline with, optionally, a minor amount of feldspar, which comprises melting a batch for a lime-containing glass composition consisting essentially, on the oxide basis, of 26–56% $SiO_2$, 25–30% $Al_2O_3$, 10–14% $Na_2O$, 4–9% CaO, 16–20% ($Na_2O$ + CaO), 0.1–4% MgO, 2.5–10% $TiO_2$, and not more than about 10 percent of other oxides in the indicated proportions selected from the group consisting of 0–5% $K_2O$, 0–10% PbO, 0–5% ZnO, 0–5% CdO, 0–2% $Li_2O$, and 0–3% $B_2O_3$, simultaneously cooling the melt at least below the transformation range of the glass and shaping a glass body therefrom, and thereafter heating said glass body at a rate not exceeding about 7.5° C. per minute to a nucleation temperature between about 680°–730° C., maintaining said glass body within that range of temperatures for at least about one-half hour, subsequently heating said body at a rate not exceeding about 5° C. per minute to a crystallization temperature between about 800°–850° C, maintaining said body within that temperature range for at least about one-half hour to obtain the crystallization of nepheline and, optionally, feldspar, and finally cooling said body to room temperature.

2. The method of claim 1 wherein, after a the glass body, said glass body is heated at a rate not exceeding about 7.5° C. per minute to a temperature within the range from about 700°–720° C., maintained within that temperature range for at least one-half hour, subsequently heated at a rate not exceeding about 5° C. per minute to a temperature between about 800°–820° C., maintained within that temperature range for at least one-half hour to attain the crystallization of nepheline and, optionally, feldspar, and finally cooled to room temperature at A rate not exceeding about 3° C. per minute.

3. The method of claim 2 wherein the rate of heating said glass body to a temperature between about 700°–720° C. ranges between about 3.3°–5.0° C. per minute.

4. The method of claim 2 wherein said glass body is maintained within said 700°–720° C. temperature range for a time ranging between about ½–1 hour.

5. The method of claim 2 wherein after maintaining said glass body within the range of temperatures from about 700°–720° C. for at least about one-half hour, said glass body is subsequently heated to a temperature between about 800°–820° C. at a range ranging from about 1.6°–3.3° C. per minute.

6. The method of claim 2 wherein said glass body is maintained within said 800°–820° C. temperature range for a time ranging between said ½–1 hour.

* * * * *